United States Patent [19]

Bailey et al.

[11] 4,401,707
[45] Aug. 30, 1983

[54] COMPOSITE HEAT PROTECTIVE FABRIC

[75] Inventors: Milton Bailey, Wayland; Kenneth Spindola, Hopdale; Sumner H. Bernstein, Holliston, all of Mass.

[73] Assignee: The United States of America as represented by the Secretary of the Navy, Washington, D.C.

[21] Appl. No.: 328,320

[22] Filed: Dec. 7, 1981

[51] Int. Cl.³ .................. B32B 3/06; B32B 15/14
[52] U.S. Cl. .................. 428/166; 2/243 A; 428/178; 428/285; 428/921
[58] Field of Search .......... 428/99, 102, 285, 921, 428/166, 178, 198, 209, 103, 104; 2/243 R, 259, 7, 8

[56] References Cited

U.S. PATENT DOCUMENTS

| | | | |
|---|---|---|---|
| 2,561,891 | 7/1951 | Tucker | 154/44 |
| 2,627,072 | 2/1953 | Frommelt et al. | 2/2 |
| 2,726,977 | 12/1955 | See et al. | 154/44 |
| 3,413,180 | 11/1968 | Smith | 161/89 |
| 3,769,146 | 10/1973 | Ravel | 428/285 |
| 3,801,422 | 4/1974 | Gorlach et al. | 106/15 |
| 4,205,110 | 5/1980 | Jean | 428/213 |
| 4,223,064 | 9/1980 | Ballif et al. | 2/2 |

FOREIGN PATENT DOCUMENTS

| | | | |
|---|---|---|---|
| 764335 | 12/1956 | United Kingdom | 2/7 |

Primary Examiner—Paul J. Thibodeau
Attorney, Agent, or Firm—Robert F. Beers; Arthur A. McGill; Prithvi C. Lall

[57] ABSTRACT

A thermally protective multilayered fabric has a thermally conductive layer sandwiched between an outer and an inner thermally reflective layer. The outer and the inner thermally reflective layers are foil/fabric laminations and the intermediate thermally conductive layer is a metallic foil lamination. A plurality of metal staples or other discrete fasteners anchor the three layers together at a plurality of discrete locations which create a multitude of thermally impeding air spaces between the layers.

8 Claims, 2 Drawing Figures

COMPOSITE HEAT PROTECTIVE FABRIC

This invention relates to the art of heat protective clothing and, more particularly, to a novel composite fabric which is especially good for repeated use by proximity firefighters in high thermal gradient scenarious encountered during air rescue or other emergency situations.

Outershields of thermally reflective materials, such as aluminized fabrics of asbestos, Nomex, rayon, cotton and Kevlar, are laminated with underlying insulating and supporting layers, such as bats, fleeces, felts and organic matter, to provide a composite fabric which is used by proximity firefighters and other personnel who are required to withstand high radiant fires (1.89 g cal/cm$^2$ per second).

The outermost aluminized or reflective fabrics, in their initial or clean state, provide a high order of thermal reflectivity which keeps the rate of heat transfer to the sub-surface supporting and insulating layers of the composite fabric within acceptable bounds. Normal handling, oxidation, abrasion, flexing, wear and other such factors, however, thermally degrade the surface of such proximity firefighters garments giving rise to localized regions which are characterized by a quantum magnification of the heat transfer rate.

At these hot spots, the adhesive which bonds the aluminization to the fabric is destroyed, causing scorching and aluminization-fabric separation. At the same time, the adhesives, the layer of the organic insulating materials and the reflecting surfaces, which are often aluminized polyester foil films, rapidly ignite due to the accelerated rate of the heat transfer therethrough. The generation of high heat and the various fumes which are released from the burning fabric and the insulating and supporting layers threaten the health and the lives of firefighting personnel.

SUMMARY OF THE INVENTION

The novel composite heat protecting fabric of the present invention is substantially free of hot spot formation and the production of noxious gases and comprises a first layer of material having a radiant heat reflecting surface; a second layer of material having a radiant heat reflecting surface; a third layer of material conductive to heat sandwiched between the first and the second radiant heat reflecting layers; and a plurality of metal staples or other discrete fasteners for anchoring the first, the second and the third layers together such that a multiplicity of heat impeding air spaces are formed between the first reflecting layer and the third conducting layer and between the third conducting layer and the second reflecting layer. The first and the second layers preferably comprise a fabric one side of which has a layer of metallization for providing thermal reflectivity and the third layer preferably comprises a thin metallic foil for providing thermally diffusive conduction.

According to one feature of the present invention, the intermediate metallic foil layer for providing thermally diffusive conduction substantially eliminates hot spot formation in those locations where the outer layer of thermally reflective material is thermally degraded. In this manner, the thermally reflective property of the inner layer of reflective material is retained despite an almost complete loss in thermal reflectivity of the outer surface. Thus, the three tiered approach of the present invention makes feasible the use of common flame retardant treated and untreated fibers like rayon, cotton, nylon, polyester and wool instead of expensive refractory fibers like asbestos and glass, and expensive specialty fibers like Kevlar, Kynol, Durette, PBI and the like.

According to another feature of the present invention, the use of staples to fasten the three layers together eliminates the need for organic or heat sensitive adhesives which melt, degrade and otherwise damage reflective surfaces and produce potentially toxic fumes. Furthermore, the use of metal staples or other discrete fasteners to anchor the layers together creates a multiplicity of heat impeding air spaces between the layers of the novel heat protecting composite fabric of the present invention which attenuates the rate of heat transfer to the sub-surface layers.

Accordingly, it is an object of the present invention to provide a composite heat protective fabric for use by proximity firefighters.

It is another object of the present invention to provide such a fabric that is substantially free of hot spot formation and thereby retains its thermal reflective properties notwithstanding thermal degradation encountered in use, handling and storage.

It is another object of the invention to provide such a composite fabric that is not subject to the potentially dangerous effects of noxious gas production.

It is another object of the present invention to provide such a fabric the wear life and effectiveness of which is significantly prolonged and which may be repeatedly used for multi-purpose firefighting applications.

These and other objects, advantages and attendant features of the present invention will become apparent by reference to the appended claims, to the following detailed description of the preferred embodiment, and to the drawings, wherein like parts are similarly designated throughout, and wherein:

DETAILED DESCRIPTION OF THE PREFERRED EMBODIMENT

Figure 1:
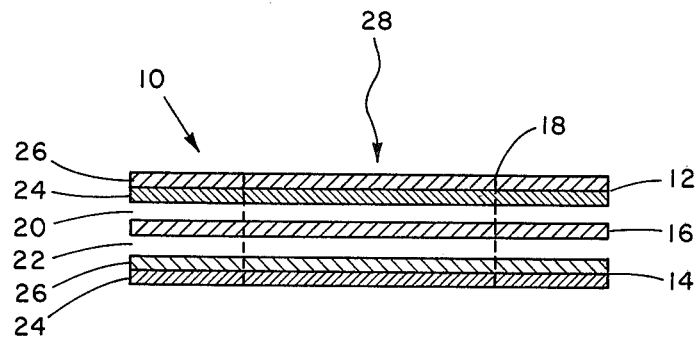
FIG. 1 is a schematic cross-sectional view showing the novel composite heat protective fabric according to the present invention.
Figure 2:
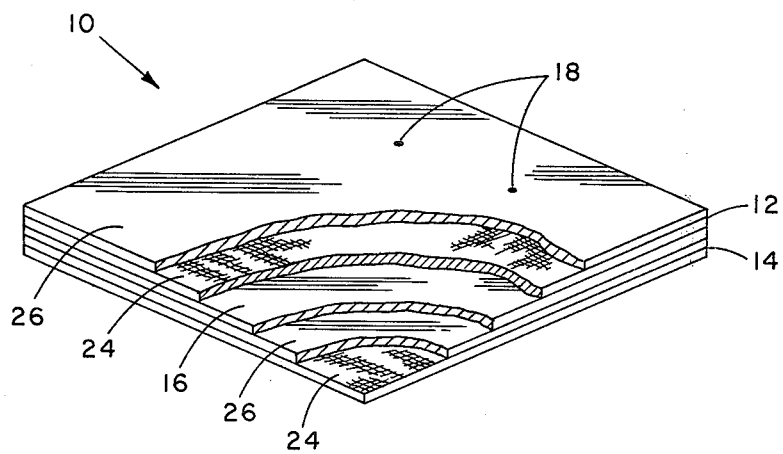
FIG. 2 is a schematic front perspective view, partly broken away, showing the novel composite heat protective fabric according to the present invention.

Referring now to FIGS. 1 and 2, generally shown at 10 is the novel composite heat protecting fabric of the present invention. The composite heat protecting fabric 10 comprises an outer layer 12 of a heat reflecting material and an inner layer 14 also of a heat reflecting material. An intermediate layer 16 of a heat conducting material is sandwiched between the outer heat reflecting layer 12 and the inner heat reflecting layer 14. Although the layers 12, 14 and 16 may be adhesively or otherwise fastened each to the other, it is preferred that a plurality of discrete fasteners such as standard steel staples or metallic thread to be used to anchor the layers together at a plurality of discrete locations as schematically illustrated at 18. In this manner, not only is the need for heat sensitive and toxic gas producing adhesives eliminated but also a multitude of heat impeding air spaces 20 are created between the outer thermally reflective layer 12 and the intermediate thermally conductive layer 16 and a like multitude of heat impeding air spaces 22 are formed between the intermediate heat conducting layer 16 and the inner heat reflecting layer 14 which serve to attenuate the rate of heat transfer to the sub-surface layers.

Each of the layers 12 and 14 preferably comprise a fabric 24 one surface of which has been covered by any suitable technique such as vacuum deposition by a thin layer of metallization 26 such as aluminum. The fabric 24 may be of a common flame retardant treated or untreated fiber such as rayon, cotton, nylon, polyester or wool. It is to be noted that each of the layers 12 and 14 may also comprise a lamination of a foil/fabric which is discretely or otherwise fastened together.

The layer of the heat conducting material 16 preferably comprises a thin (0.002 mil) foil of a high heat conducting metal such as aluminum. Other suitable metals such as zinc, copper or lead may be utilized as well.

In operation, a pulse of radiant heat 28 incident on the outer reflecting layer 12 of the composite heat protecting fabric 10 of the present invention is substantially reflected off of the thermally sound areas of the outer layer 12 preventing the transmission of the principal part of the incident thermal energy 28 to the sub-surface. In those regions of the outer layer 12 that have been thermally degraded, the heat energy 28 which is transmitted through rather than reflected off the outer reflective layer 12 encounters at least one of the multiplicity of heat impeding air spaces 20 which attenuate the rate of heat transfer. The residual transmitted heat is diffused by thermal conduction through the layer of the foil 16. Despite the contamination by the carbonized residue of the burnt outer layer 12 in these regions, it has been found that the heat conducting layer 16 remains whole preventing the thermal degradation of the heat reflecting layer 14 which retains its reflectivity and integrity.

The novel three tiered system of the present invention has been found to decrease the rate of heat transfer to the sub-surface by more than fifty (50) percent. When subjected, for example, to a 1.89 g cal/cm$^2$ per second pulse, the heat transfer rate through the composite heat protecting fabric 10 of the present invention has been found to rise to one hundred-seventeen (117) g cal/cm$^2$ in fifty-hour (54) seconds versus twenty-three (23) seconds for a non-sandwiched two layer configuration.

In summary, there has been disclosed a novel composite heat protective three tiered fabric. The three components are thermal reflectivity provided by an inner and an outer heat reflective layer; thermal diffusivity provided by an intermediate heat conductive layer and thermal attenuation provided by a multiplicity of heat impeding air spaces. The composite heat retardant fabric of the present invention is especially suitable for repeated use where chronic, uncertain, and unpredictable combat and work fire hazards exist or will be encountered.

It is to be clearly understood that many modifications of the presently disclosed invention may be effected without departing from the scope of the appended claims.

What is claimed is:

1. A composite heat resistant fabric, comprising:
   an outer layer of material having a radiant heat reflecting surface;
   an inner layer of material having a radiant heat reflecting surface;
   an intermediate heat conducting layer sandwiched between the outer and the inner layers; and
   a plurality of fasteners for joining the outer, the inner and the intermediate layers at discrete locations and for forming a like multiplicity of heat-impeding air spaces between the outer and the intermediate layers and between the intermediate and the inner layers respectively.

2. A composite heat resistant fabric, as recited in claim 1, wherein said outer and said inner layers comprise a fabric having a covering of metallization on one surface thereof.

3. A composite heat retardant fabric, as recited in claim 2, wherein said covering of metallization comprises aluminum.

4. A composite heat retardant fabric, as recited in claim 1, wherein said intermediate layer comprises a heat conducting metallic foil.

5. A composite heat retardant fabric, as recited in claim 4, wherein said heat conducting metallic foil is an aluminum foil.

6. A composite heat retardant fabric, as recited in claim 1, wherein said fasteners comprise metal staples.

7. A composite heat retardant fabric, as recited in claim 1, wherein said fasteners comprise metal thread.

8. A thermally protective multilayered fabric, as recited in claims 1, wherein said first and said second layers comprise a metallic-foil/fabric lamina and said third layer comprises a conducting metallic foil.

* * * * *